United States Patent [19]

Obuchi et al.

[11] Patent Number: 5,141,714
[45] Date of Patent: Aug. 25, 1992

[54] EXHAUST GAS CLEANER

[75] Inventors: Akira Obuchi; Hidenori Yoshiyama; Akihiko Ohi; Hyogoro Aoyama; Hideo Ohuchi; Atsushi Ogata, all of Tsukuba; Koichi Mizuno, Ibaraki; Seiji Makino, Saitama; Kiyohide Yoshida, Saitama; Gyo Muramatsu, Saitama; Nobuyuki Matsumura, Saitama; Satoshi Sumiya, Saitama; Yoshikazu Takahashi, Saitama, all of Japan

[73] Assignee: Kabushiki Kaisha Riken, Tokyo, Japan

[21] Appl. No.: 560,556

[22] Filed: Jul. 31, 1990

[30] Foreign Application Priority Data

Aug. 1, 1989 [JP] Japan .................. 1-199659
Apr. 20, 1990 [JP] Japan .................. 2-105021
Apr. 20, 1990 [JP] Japan .................. 2-105022

[51] Int. Cl.⁵ .................. B01D 53/34; F01N 3/10
[52] U.S. Cl. .................. 422/174; 422/169; 422/171; 422/173; 422/177; 422/181; 422/199; 422/218; 502/344; 502/303; 502/304; 423/213.2; 423/213.5; 60/300; 60/303; 55/DIG. 30
[58] Field of Search .................. 422/169, 171, 173, 174, 422/177, 181, 199, 218; 502/344, 303, 304; 423/213.2, 213.5; 60/300, 303; 55/DIG. 30

[56] References Cited

U.S. PATENT DOCUMENTS

| | | | |
|---|---|---|---|
| 3,811,845 | 5/1974 | Nakamura | 422/181 X |
| 4,438,082 | 3/1984 | Dettling et al. | 423/213.5 X |
| 4,492,770 | 1/1985 | Blanchard et al. | 502/304 |
| 4,515,758 | 5/1985 | Domesle et al. | 423/213.2 |
| 4,668,655 | 5/1987 | Lewis et al. | 502/304 |
| 4,686,827 | 8/1987 | Wade et al. | 60/303 X |
| 4,711,870 | 12/1987 | Yamada et al. | 520/303 |
| 4,749,671 | 6/1988 | Saito et al. | 502/304 X |
| 4,759,918 | 6/1988 | Homeier et al. | 55/DIG. 30 X |
| 4,813,231 | 3/1989 | Bykowski | 55/DIG. 30 X |
| 4,829,766 | 5/1989 | Henkel | 60/303 |
| 4,913,712 | 4/1990 | Gabathuler et al. | 55/DIG. 30 X |

FOREIGN PATENT DOCUMENTS 57-203812 12/1982 Japan .

*Primary Examiner*—Robert J. Warden
*Assistant Examiner*—Stephanie Blythe
*Attorney, Agent, or Firm*—Brumbaugh, Graves, Donohue & Raymond

[57] ABSTRACT

An exhaust gas cleaner comprising (a) at least one filter made of a heat-resistant and electrically insulating material for trapping floating fine particles in an exhaust gas; and (b) at least a pair of electrodes stacked with the filter alternately, voltage being applied between the adjacent electrodes to burn electrically conductive and burnable fine particles trapped in the filter by heat generated by a current flowing between the adjacent electrodes, and the direction of the flow of the exhaust gas in the filter being essentially parallel to that of the laminate surface of the electrodes. The filter may carry a catalyst which functions to reduce harmful gas components in the exhaust gas.

11 Claims, 4 Drawing Sheets

EXHAUST GAS CLEANER

BACKGROUND OF THE INVENTION

The present invention relates to an exhaust gas cleaner having a filter which traps fine particles in exhaust gases, more particularly to an exhaust gas cleaner having a filter which traps fine carbonaceous particles (hereinafter referred to as "particulate matter") in exhaust gases discharged from diesel engines, soot in exhaust gases from boilers, etc.

Since floating fine particles such as particulate matter in exhaust gases discharged from diesel engines, soot from boilers, etc., are one of the causes of environmental pollution, exhaust gases are often filtered to remove them. In this method, filters choked up with the accumulated fine particles after use for some period should be exchanged to new one, or the filters should be cleaned up by removing the fine particles by some methods.

Conventionally, filters made of heat-resistant ceramics such as cordierite or a metal wire mesh, etc., are used, and fine particles accumulated in the filters are burned away by some heat source such as a burner, an electric heater, etc. In this conventional method, however, the filters are most likely to be damaged or melted by some spot heating or so during the burning of fine particles. To avoid this problem, the amount of the fine particles accumulated in the filters, the concentration of oxygen in the exhaust gas, etc. should be controlled.

To reduce the amount of the accumulated fine particles in the filters by using a method of burning them automatically, it is necessary to detect a change in pressure of the exhaust gas and to operate the heat source which ignites the fine particles in the filter in accordance with the pressure change, because the change in pressure of the exhaust gas can be a measure of how much the fine particles are accumulated, in other words, how much the filters are choked up. However, if a detection level is set such that the heat source is operated at high pressure generated by a high speed operation of the engine, the heat source would be idle when the engine is operated at a low speed, resulting in the clogging of the filter. On the other hand, if a detection level is set such that the heat source is operated even at a low gas pressure, the heat source would be operated most time, leading to an excess energy loss. Particularly in the former case, a fuel efficiency of the engine is lowered.

To solve these problems, a method of cleaning filters for reuse was proposed (Japanese Patent Laid-Open No. 57-203812). In this method, filters made of insulating materials are provided with electrodes to cause an electric current to flow through the fine particles trapped in the filter, thereby burning the fine particles in the filters with heat generated by the current flow.

Figure 5:
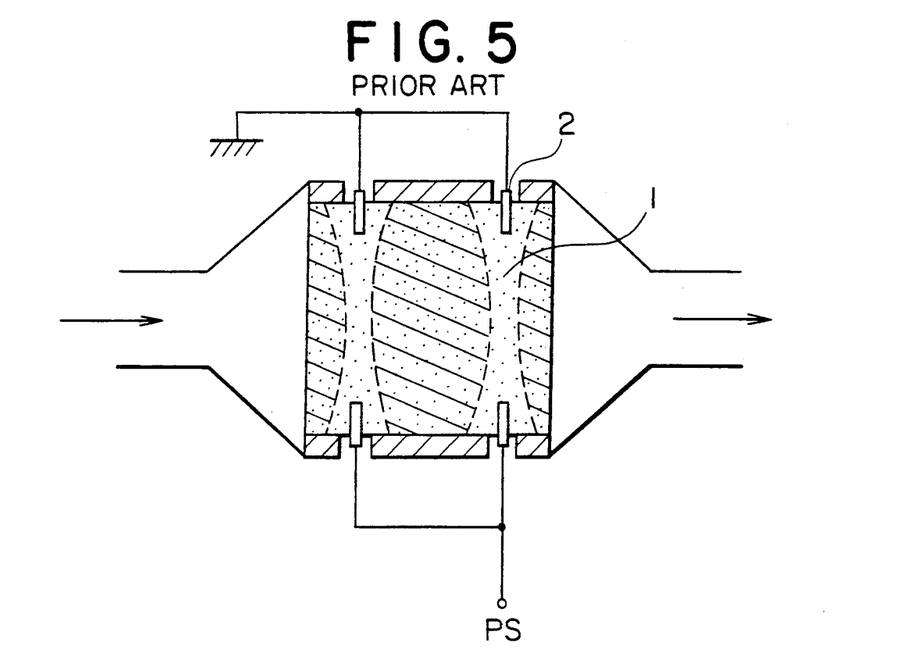
FIGS. 5-7 are schematic, cross-sectional views, each showing a conventional exhaust gas cleaner.

FIG. 5 shows a conventional exhaust gas cleaner based on the above principle. This exhaust gas cleaner comprises a porous filter 1 made of an insulating material with electrode rods 2 inserted into the filter 1. It is, however, difficult in this exhaust gas cleaner to burn up the trapped fine particles in all parts of the filter 1 completely by the current flow between the electrodes, leaving a part of the filter (shaded part in FIG. 5) clogged with the unburned fine particles. Increasing voltage applied between the electrodes to avoid partial clogging of the filter as mentioned above may cause a partial damage or fusion of the filter because of an excess spot current.

Figure 6:
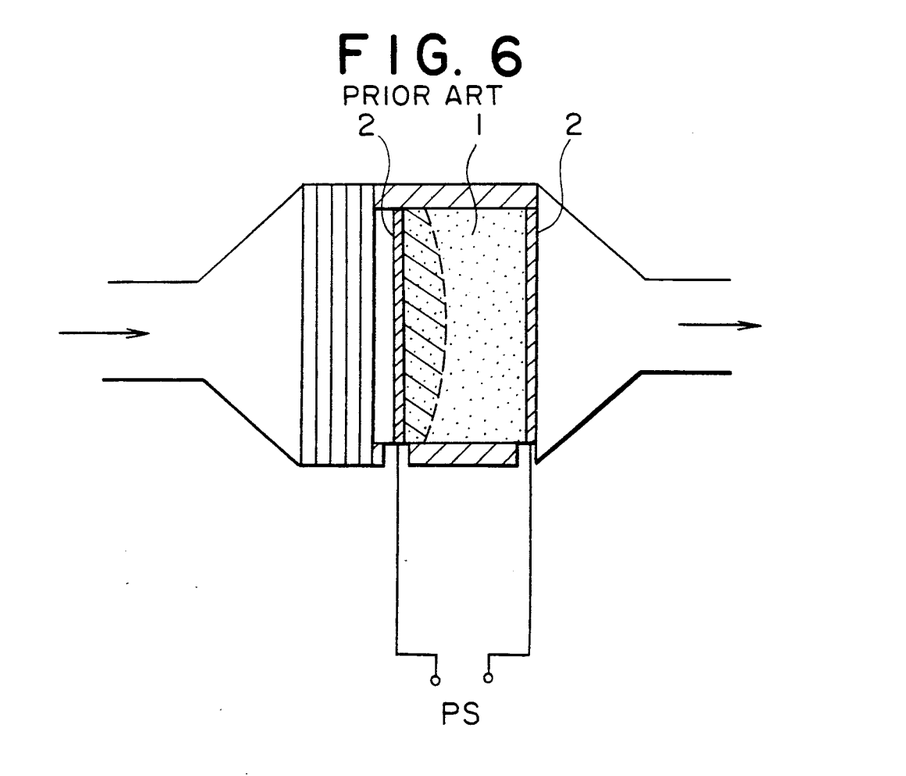

FIG. 6 is a schematic cross-sectional view showing another conventional exhaust gas cleaner. This exhaust gas cleaner has a filter 1 made of an insulating material and electrodes 2, 2, each of which is in contact with each opposing end side of the filter 1. In this exhaust gas cleaner, the filter 1 is likely to get clogged with fine particles near the inlet side (shaded part in FIG. 6) of the filter. Increasing voltage between the electrodes 2, 2 may also cause a damage of the filter because of an excess spot current in the filter.

Figure 7:
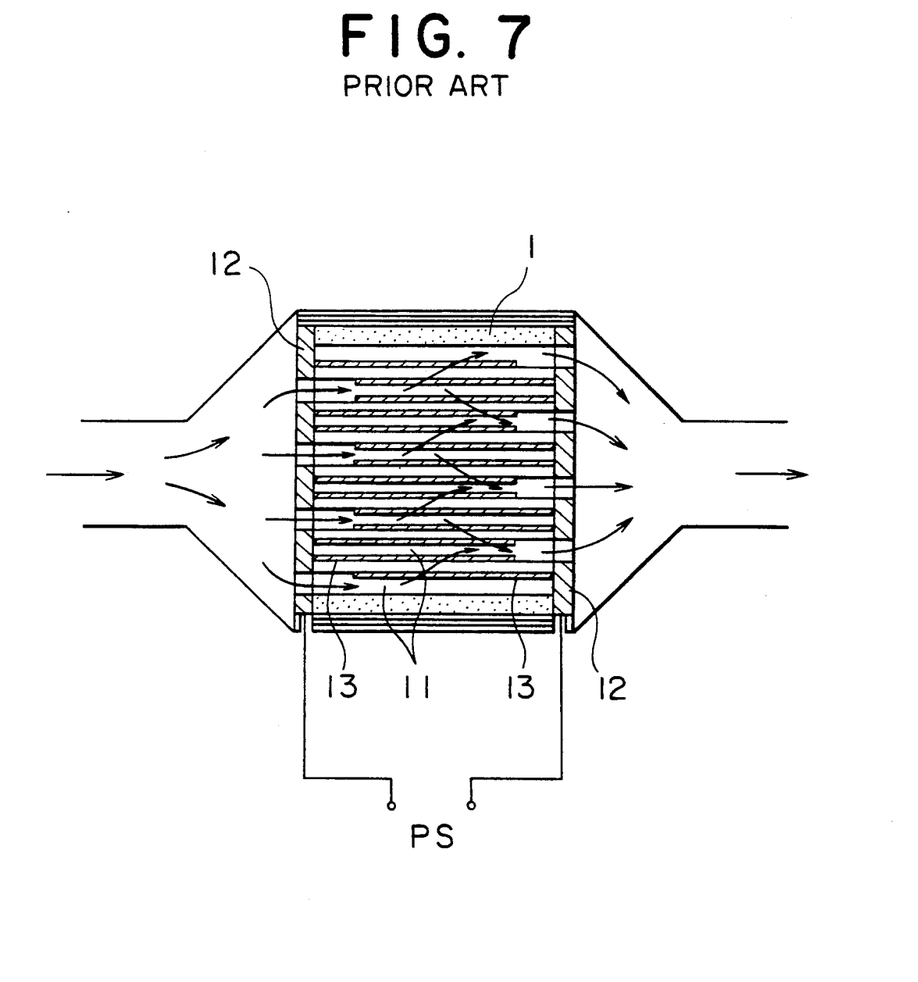

FIG. 7 shows another conventional exhaust gas cleaner. This exhaust gas cleaner comprises (a) a cylindrical filter 1 having a plurality of holes 11 extending axially, and (b) two electrodes 12, 12, each of which is in contact with the filter at the opposite side. One end of each hole 11 is covered with either electrode 12. Thus, one hole 11 which is covered with the electrode 12 at the inlet side (the left side of the filter 1 in FIG. 7) is open at the other end (the outlet side) of the hole 11, and another hole 11 which is opened at the inlet side is covered with the other electrode 12 at the outlet side. On the inner wall of the holes 11, electrode wires 13 are placed. Once the length of the wires 13 in the holes 11 is chosen long enough to cover almost all region from the inlet side to the outlet side, clogging with the fine particles may be avoided. However, the electrode wires 13 in the holes 11 prevent the exhaust gas from smoothly flowing in the filter. Aside from that, fixing the wires 13 on the inner walls of the holes 11 is quite difficult.

Therefore, an exhaust gas cleaner which is free from these problems mentioned above has been sought.

OBJECT AND SUMMARY OF THE INVENTION

An object of the present invention is to provide an exhaust gas cleaner which has a filter for trapping fine particles which cause environmental pollution and which is capable of cleaning the filter for reuse by burning trapped fine particles such as particulate matter in an exhaust gas discharged from a diesel engine, etc. with high efficiency.

As a result of intense research in view of the above object, the inventors have found that fine particles trapped in a filter can easily be burned away to avoid clogging of the filter if the filter is stacked with electrodes alternately, between which voltage is applied, and the exhaust gas is caused to flow along the direction of the laminate surface of the electrodes.

Thus, the exhaust gas cleaner according to the present invention comprises (a) at least one filter made of a heat-resistant and electrically insulating material for trapping floating fine particles in an exhaust gas; and (b) at least a pair of electrodes stacked with the filter alternately, voltage being applied between the adjacent electrodes to burn electrically conductive and burnable fine particles trapped in the filter by heat generated by a current flowing between the adjacent electrodes, and the direction of the flow of the exhaust gas in the filter being essentially parallel to that of the laminate surface of the electrodes.

In a preferred embodiment, the filter of the exhaust gas cleaner carries a catalyst which functions to reduce harmful gas components.

DETAILED DESCRIPTION OF THE INVENTION

Figure 1:
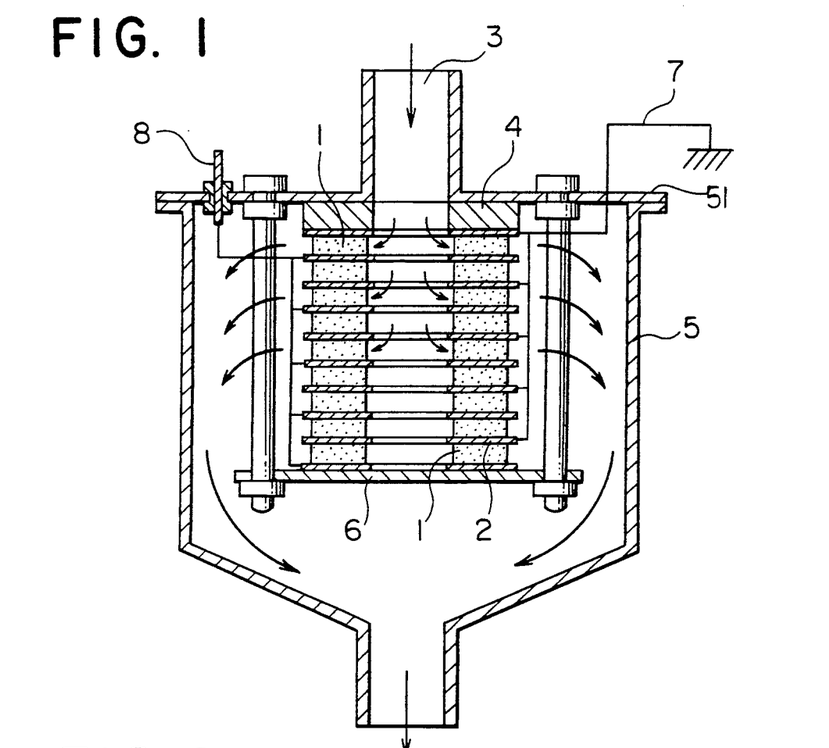
FIG. 1 is a cross-sectional view of an exhaust gas cleaner according to one embodiment of the present invention.

FIG. 1 is a cross-sectional view of an exhaust gas cleaner according to one embodiment of the present invention. The exhaust gas cleaner comprises a plurality of filters 1, a plurality of electrodes 2 stacked with the filters 1 alternately, an insulating member 4 and a housing 5. The housing 5 is provided at its top end with a cover 51 having a pipe 3 which defines a passage for an exhaust gas. The pipe 3 is connected to an exhaust pipe (not shown) for an exhaust gas from an engine.

Figure 2:
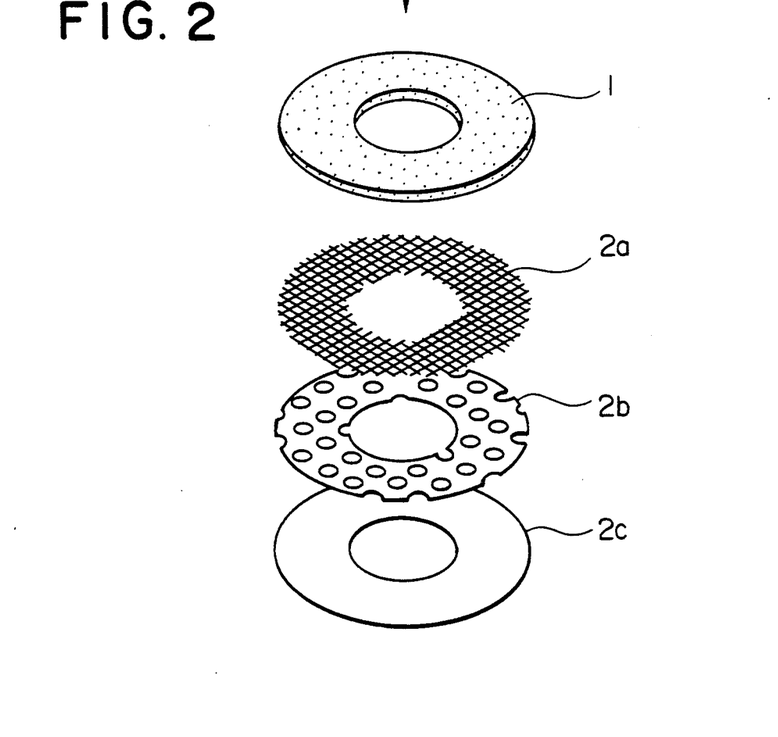
FIG. 2 is a perspective view showing examples of filters and electrodes which may be used in the exhaust gas cleaner according to the present invention.

As shown in FIG. 2, each filter 1 is in a disc shape made of a porous, heat-resistant, electrically insulating material having a hole in the center. It is advantageous to use a thin disc for the filter 1 because not much voltage will be required between the electrodes 2 provided on both surfaces of the filter 1 for burning particulate matter. However, it is practical to use filters, each of which is 1 mm thick or more, because such filters are more efficient in trapping particulate matter. Also, the manufacturing cost of such filters may become quite low.

As for the electrode 2, a metal mesh disc 2a, a punched metal disc 2b, or a plain disc 2c shown in FIG. 2, etc. may be used. Each of the electrodes 2 also has a hole in the center.

The filters 1 and the electrodes 2 are alternately stacked, and a stack of the filters 1 and the electrodes 2 is covered by an insulating plate 6 at its bottom end. The insulating plate 6 is fixed to the cover 51 of the housing 5 by bolts with the insulating member 4 laid in between. As a result, center holes of the stacked filters 1 and electrodes 2 are aligned with the passage of the pipe 3 of the housing 5 as shown in FIG. 1.

Every other electrode 2 is connected to a lead wire 7 as the same polarity, and the rest are also connected to another lead wire 8 as the opposite polarity. In this embodiment, one lead wire 7 is grounded, and the other 8 is connected to a power source (not shown), so that voltage may be applied between adjacent electrodes 2 with each filter 1 in between.

Ceramics such as cordierite, silica, etc., glass wool, or some other insulating and highly heat-resisting material may be used for the filter 1. A material which is inexpensive and has low energy loss, high heat resistance and high insulating characteristic is suitable for the electrode 2. The insulating member 4 is required to have high heat resistance, high corrosion resistance and low expansion coefficient because it is always in contact with the exhaust gas. Therefore, ceramics such as cordierite, etc., may be suitably used for the insulating material 4. A material for the housing 5 needs to have high heat resistance, high corrosion resistance and good mechanical strength. Stainless steel may be used for the housing 5.

In a preferred embodiment, some catalysts are carried on the filters 1 to reduce harmful gas components such as $NO_x$, CO, unburned hydrocarbons (hereinafter referred to as "HC"), etc. in the exhaust gas.

Catalysts which may be used in the present invention are as follows:

(1) A first catalyst consisting essentially of (a) at least one of alkali metal elements; (b) one or more elements selected from the group consisting of elements in IVA, VA, VIA, and VIII groups in the Periodic Table excluding platinum-group elements, Cu, Zn and Sn; and (c) at least one of rare earth elements.

The elements (b) are specifically IVA (Ti, Zr, Hf), VA (V, Nb, Ta), VIA (Cr, Mo, W), VIIA (Mn, Tc, Re), VIII (Fe, Co, Ni) and Cu, Zn and Sn.

Thus, preferable combinations of the elements (a), (b) and (c) are:

(a) K, Na, Cs;
(b) Cu, V, Mn; and
(c) Ce, La, Nd.

More preferable combinations of the elements (a)-(c) are K/Cu/Ce, K/Cu/V/Ce, Cs/Cu/La, Cs/Cu/Ce, and K/Cu/La.

The contents of the elements (a), (b) and (c) in the first catalyst may be 0.1-10 weight %, 1-10 weight %, and 0.1-5 weight %, respectively, as metal components in totality, based on the weight of the carrier applied to the filters which will be described below.

This catalyst can perform the reduction reaction of $NO_x$ to $N_2$ even at a low temperature. In the reduction reaction, HC and particulate matter in the exhaust gas serve as reducing agents. The reason why the reduction reaction of $NO_x$ occurs even at a low temperature is considered to be a synergistic effect of particulate matter and catalysts consisting essentially of alkali metals, transition metals and rare earth metals.

(2) A second catalyst consisting essentially of elements in the platinum group.

This catalyst may preferably be a Pt catalyst, a Pd catalyst, an Rh catalyst or a mixture thereof. Also, preferable combinations of the second catalysts are Pt/Pd, Pt/Rh, Pd/Rh, etc. The amounts of the platinum-group elements are preferably 0.1-1 weight %, based on the weight of the carrier applied to the filters.

Au and/or Ag may be added to each of the first and second catalyst to enhance the catalytic activity. The amount of Au and/or Ag is 0.1-5 weight % based on the total weight of the catalyst, when added to the first catalyst, and 1-50 weight % when added to the second catalyst.

Also, alloys such as Co-Fe, Co-Ni-Mn-Re, Ni-Co-P, Ni-Fe-P, etc., or their amorphous alloys may be added as components of the catalysts.

The catalysts mentioned above may be carried on a $TiO_2$ or complex compounds of $TiO_2$ such as $TiO_2.Al_2O_3$, $TiO_2.SiO_2$, $TiO_2.ZrO_2$, etc., coated on the filters.

$TiO_2$ is a good carrier for carrying the catalysts by a photochemical method. The sites of the filters for carrying catalysts can be chosen freely by this method. The catalysts may be carried homogeneously in a wide region of the filter. The insulating property of the filter is not affected by the coating of $TiO_2$.

A method of carrying catalysts on $TiO_2$ may be as follows:

The inner and outer surfaces of the doughnut-shaped filters are coated with porous $TiO_2$ or its complex compounds. In this embodiment, the inner surfaces of the filters are the entrance of the exhaust gas to the filters, and the outer surfaces of the filters are the exit of the exhaust gas from the filters. After coating $TiO_2$ or its complex compounds, they are impregnated with a catalyst solution on the desired sites of the filters and fixed by exposing to a light source.

Another method may be taken: Powder of $TiO_2$ or its complex compound is impregnated with a catalyst by the photochemical method in advance, and the powder of $TiO_2$ or its complex compound which carries the catalyst is then coated on a desired site of the filter.

In the impregnation of a carrier with a catalyst by the photochemical method, an aqueous solution of a metal compound for a catalyst may be used. In a case where Pt is chosen as the catalyst, aqueous solutions such as sodium chloroplatinate, potassium chloroplatinate, ammonium chloroplatinate, etc., may be used.

In the present invention, either one or both of the first and second catalysts mentioned above may be used. When the two types of catalysts are used at the same time, it is desirable that the two types of catalysts are separately supported by two portions of the filter. In this case, a catalyst for reducing $NO_x$ by using HC and particulate matter (first catalyst) may be supported at the inlet side of the filter, which is the inner surface of the doughnut-shaped filter in FIG. 1. The Pt-group catalyst for removing HC and CO (second catalyst) may be supported at the outlet side of the filter, which is the outer surface of the filter in FIG. 1.

The above distribution of the first and second catalysts on the filter gives a high capability of cleaning the exhaust gas for the following reasons:

On the surface of the first catalyst supported at the inlet side of the filter, particulate matter and HC are burned in the presence of oxygen easily and effectively. At the same time, $NO_x$ is reduced by particulate matter and HC, both of which are acting as reducing agents. Consequently, both particulate matter and $NO_x$ are removed simultaneously with high efficiency. At the outlet side of the filter, CO and remaining HC are expected to be converted to non-harmful gas components by the reaction with oxygen in the exhaust gas. Therefore, no drastic pressure loss in the exhaust gas cleaner will be expected.

Figure 3:
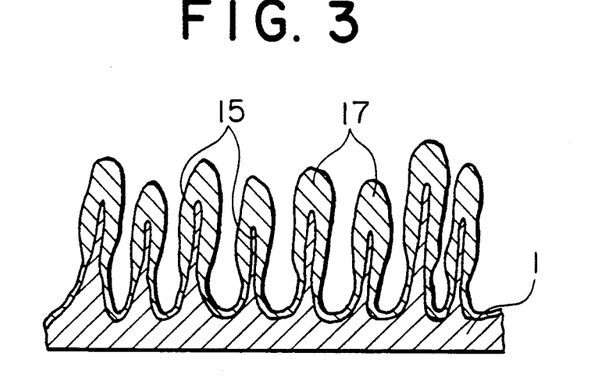
FIG. 3 is an enlarged schematic cross-sectional view showing a surface state of a filter carrying a catalyst.

In a preferred embodiment, the surface of the filter 1 may be modified to have a plurality of fine projections 15 as shown in FIG. 3. In this case, a catalyst layer 17 is formed on the fine projections 15. The fine projections 15 may be formed by a sputter-etching method including a plasma etching, chemical etching using acids or bases, etc. In the case of chemical etching, etch pits are formed on the surface of the filter by a chemical reaction with an acid or a base. Preferable dimensions of the fine projections 15 are as follows:

(a) Average diameter smaller than one micron; and
(b) Aspect ratio (length/diameter) of 10 or less, preferably 8 to 4.

It is advantageous to form the fine projections 15 on the surface of the filter for the following reasons:
(a) As the surface area of the filter becomes extremely larger, the amount of the catalyst to be carried increases;
(b) Catalytic action is expected to be higher due to a good dispersion of the catalyst on the filter; and
(c) The catalyst is much more strongly supported by the filter.

The function of the exhaust gas cleaner will be explained below. As shown by arrows in FIG. 1, an exhaust gas containing fine particles like particulate matter and harmful gas components such as HC, $NO_x$, CO, etc., comes into the exhaust gas cleaner through the pipe 3. The exhaust gas then passes through the filters 1 from the inner surfaces to the outer surfaces. When the exhaust gas passes through the filters 1, the fine particles in the exhaust gas are trapped by the filters 1. Since voltage is being applied between the adjacent electrodes 2, 2, a current flow starts through the trapped fine particles once the amount of the trapped fine particles is large enough to conduct an electric current. As a result, the fine particles get ignited by the heat generated by the current flow. After burning the trapped fine particles, current flow stops and the heat generation also stops. In a preferred embodiment, the catalysts supported in the filters 1 accelerate the burning of the fine particles. The catalysts also function to reduce HC, $NO_x$ and CO in the exhaust gas.

Since the filters 1 and the electrodes 2 are alternately stacked and the electrodes 2 are formed so as to cover all the region of the filter 1 from the inlet surface to the outlet surface, fine particles trapped in all parts of the filter 1 are surely burned away.

The filters which have surfaces provided with fine projections, etc. by etching provide a greater contact area with the exhaust gas, leading to an increase in the capability of cleaning the exhaust gas.

Incidentally, the direction of the exhaust gas flow can be reversed; in this case, the exhaust gas flows through the filters 1 from the outer surfaces to the inner surfaces. The function of this latter exhaust gas cleaner, however, is expected to be the same as in the case of the opposite exhaust gas flow direction.

Figure 4:
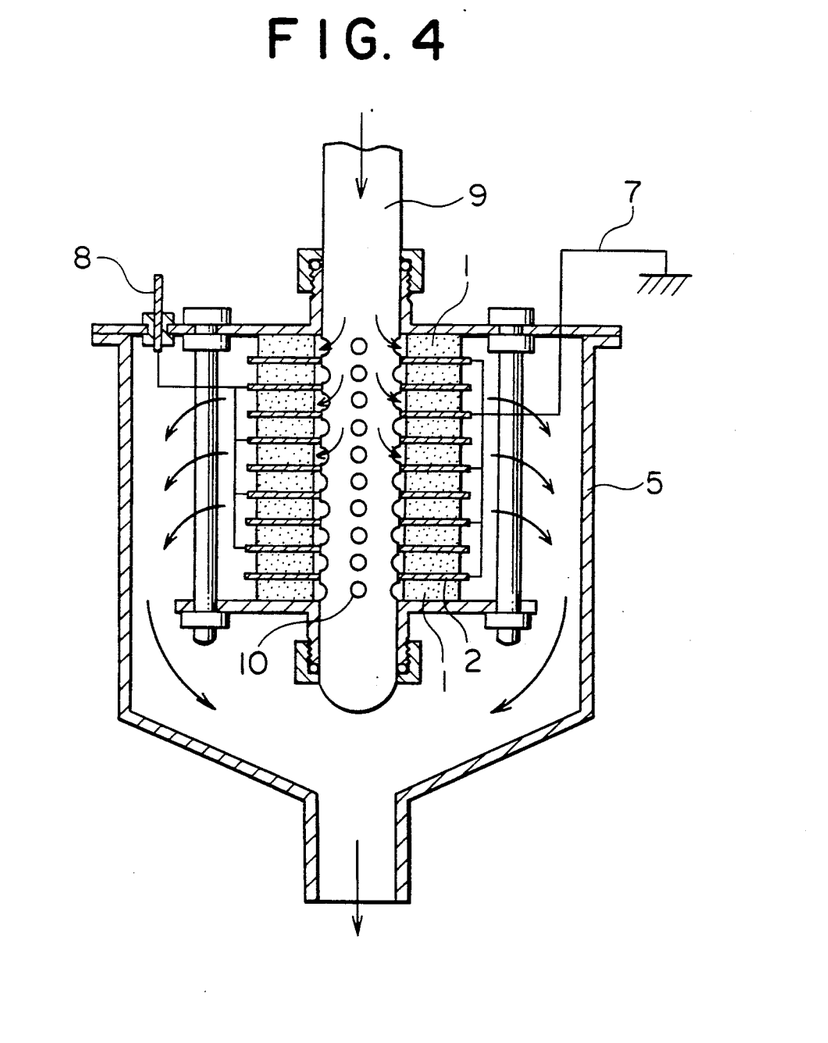
FIG. 4 is a cross-sectional view showing an exhaust gas cleaner according to another embodiment of the present invention.

FIG. 4 is a cross-sectional view showing an exhaust gas cleaner according to another embodiment of the present invention. In this exhaust gas cleaner, a heat-resistant ceramic tube 9 whose side wall has small openings 10 is received in a vertical cavity formed by the center holes of the stacked filters 1 and electrodes 2. The openings 10 of the ceramic tube 9 are located in the region of the stacked filters 1. Because of the ceramic tube 9, an exhaust gas having a higher temperature can be treated without any damage to the filters 1. The exhaust gas cleaner is also reinforced by the ceramic tube 9.

The present invention will be explained in further detail by the following Examples.

EXAMPLE 1

An exhaust gas cleaner shown in FIG. 4 was mounted to a passage of an exhaust gas discharged from a diesel engine. Each filter 1 in the exhaust gas cleaner was a 1-mm-thick disc made of a glass wool. A copper wire mesh disc shown by 2a in FIG. 2 was employed as a grounded electrode. On the other hand, a stainless steel disc shown by 2b in FIG. 2 was employed as a non-grounded electrode. Both electrodes were 1 mm thick. Cordierite was used for the ceramic tube 9.

A dc voltage (24 V) was applied between the electrodes during the flow of the exhaust gas. The pressure difference of the exhaust gas between the inlet and the outlet of the housing 5 (referred to as "pressure loss," hereinafter) and the amplitude of the current flowing between the electrodes were measured.

As a result, it was observed that immediately after 3 A of maximum current flowed, the pressure difference became small. This means that particulate matter trapped by the filters were burned when the amount of the particulate matter in the filters was enough to conduct a current between the electrodes.

EXAMPLE 2

10 weight %, based on the weight of the filters, of alumina was coated on the filters made of mullite by an impregnation method. Supported by the coated alumina was 0.5 weight %, based on the alumina, of Pt as a catalyst.

The filters prepared in the above manner were built in the exhaust gas cleaner as shown in FIG. 4. The pressure difference and the current flow were measured in the same manner and under the same conditions as in Example 1. The concentrations of $NO_x$, CO and HC were also measured continuously at the inlet and the outlet of the exhaust gas cleaner.

The drop of the pressure difference was observed immediately after a current having a maximum amplitude of 2.5 A flowed. The concentrations of gas components observed are shown in Table 1. As is seen in the table, the concentrations of CO and HC drastically decreased. A slight decrease in $NO_x$ was also observed.

TABLE 1

| Gas Component | Concentration (ppm) | |
| --- | --- | --- |
| | At Inlet | At Outlet |
| $NO_x$ | 470 | 450 |
| CO | 466 | 150 |
| HC | 88 | 20 |

EXAMPLE 3

10 weight %, based on the weight of the filters, of alumina was coated on doughnut-shaped filters made of mullite by an impregnation method. K, Cu and Ce were carried on the filters as catalysts. Each catalyst component (K, Cu and Ce) was 2 weight % based on the weight of the alumina.

The filters prepared above were built in the exhaust gas cleaner shown in FIG. 4. The pressure difference between the inlet and the outlet, and the concentrations of gas components were measured in the same way as in Example 2.

As a result, it was observed that the pressure difference became small immediately after a current having a maximum amplitude of 2.2 A flowed between the electrodes. The concentrations of gas components observed are shown in Table 2. As is seen in the table, $NO_x$ and HC were decreased.

TABLE 2

| Gas Component | Concentration (ppm) | |
| --- | --- | --- |
| | At Inlet | At Outlet |
| $NO_x$ | 470 | 440 |
| CO | 450 | 448 |
| HC | 90 | 80 |

EXAMPLE 4

Doughnut-shaped filters made of mullite, each of which was 1 mm thick, were coated with $TiO_2$ in an amount of 2 weight % based on the weight of the filters. After being coated with $TiO_2$, the filters were dipped in an aqueous solution of chloroplatinic acid ($H_2PtCl_6$). After the dipping in the solution of the chloroplatinic acid, the filters were exposed to a Mercury light source of 500 W in order to decompose the chloroplatinic acid and fix a Pt catalyst to the filters firmly. The filter thus obtained is referred to as $Pt/TiO_2$ hereinafter. Another filter carrying another kind of catalyst will also be expressed in the same way.

A copper wire mesh disc was used as a grounded electrode, and a plain disc made of a stainless steel was used as a non-grounded electrode. Both electrodes were 1 mm thick. A cordierite tube was employed as the ceramic tube 9 in the exhaust gas cleaner.

These parts were built in the exhaust gas cleaner in a manner as shown in FIG. 4. The exhaust gas cleaner was mounted to the passage for an exhaust gas discharged from a diesel engine, which contained 3 mg/min of particulate matter.

Pulse dc voltage of 35 V high was applied between electrodes while the diesel engine was operated, and the pressure difference between the inlet and the outlet (pressure loss) was measured. It was observed that as soon as the current reached a maximum level, particulate matter were burned. Immediately after the start of the burning of the particulate matter, the amplitude of the current dropped. The maximum pressure loss then was measured. The concentrations of CO, HC and $NO_x$ in the exhaust gas at the inlet and the outlet of the exhaust gas cleaner were also measured.

EXAMPLE 5

A doughnut-shaped disc made of cordierite which was 1 mm thick was coated on inner and outer surfaces with $TiO_2$ in an amount of 2 weight % based on the weight of the disc. The disc coated with $TiO_2$ then was dipped in an aqueous solution of ammonium chloroplatinate [$(NH_4)_2PtCl_6$] with chloroauric acid [$HAuCl_4$].

The cordierite disc then was exposed to an Hg lamp in the same way as in Example 4 in order to decompose the above compounds and fix Pt and Au to the filters firmly. The amount of Pt carried on the cordierite disc was 0.2 weight % based on the weight of $TiO_2$. As for Au, it was 10 weight % based on the weight of Pt. The disc prepared above was used as a filter. This filter is expressed simply as $Pt/Au/TiO_2$.

The filters were built in the exhaust gas cleaner in the same manner as in FIG. 4. The pressure loss and the concentrations of gas components CO, HC and $NO_x$ in an exhaust gas were measured in the same way as in Example 4. The results are shown in Table 3.

EXAMPLES 6-10

Doughnut-shaped filters made of mullite were coated with $TiO_2$ in an amount of 2 weight % based on the weight of the filters in the same manner as in Example 4. The filters were then dipped in an aqueous solution of ammonium chloroplatinate [$(NH_4)_2PtCl_6$] with rhodium chloride [$RhCl_3$]. After the dipping, the filters were exposed to an Hg lamp for fixing catalyst components in the same way as in Example 4. The amount of Pt carried was 0.2 weight %, and the amount of Rh carried was 0.05 weight %, both based on the weight of $TiO_2$.

The filters prepared by the above procedure were used in the Example 6. The filters are expressed as $Pt/Rh/TiO_2$.

Other filters carrying catalysts having the following compositions were produced in the same manner as in Example 6:

| | |
|---|---|
| Example 7: | Pt/Ag/TiO$_2$. |
| Example 8: | Pd/TiO$_2$. |
| Example 9: | Pd/Au/TiO$_2$. |
| Example 10: | Pd/Ag/TiO$_2$. |

In the preparation of the filters in Example 7, an aqueous solution of (NH$_4$)$_2$PtCl$_6$ with AgNO$_3$ was used for dipping. The amount of Pt carried by light exposure was 0.2 weight % based on the weight of TiO$_2$. The amount of Ag carried on the filters was 10 weight % based on the weight of Pt.

In the preparation of the filters in Example 8, an aqueous solution of PdCl$_2$ was used. The amount of Pd carried by the light exposure was 0.2 weight % based on the weight of TiO$_2$.

In the preparation of the filters in Example 9, an aqueous solution of PdCl$_2$ with [HAuCl$_4$] was used. The amount of Pd carried on the filter was 0.2 weight % based on the weight of TiO$_2$. The amount of Au carried on the filters after exposure to the light was 10 weight % based on the weight of Pd.

As for the filters in Example 10, an aqueous solution of PdCl$_2$ with AgNO$_3$ was used. The amount of Pd carried on the filter was 0.2 weight % based on the weight of TiO$_2$. The amount of Ag carried was 10 weight % based on the weight of Pd.

The catalyst-carrying filters in each Example were built in the exhaust gas cleaner in the same manner as in Example 4. The pressure loss and the concentrations of CO, HC and NO$_x$ in the exhaust gas were measured in the same manner. The results are also shown in Table 3.

TABLE 3

| | | Concentration of Exhaust Gas Components (ppm) | | | | | |
|---|---|---|---|---|---|---|---|
| | Pressure | CO | | HC | | NO$_x$ | |
| Example No. | Loss (mmAq) | at Inlet | at Outlet | at Inlet | at Outlet | at Inlet | at Outlet |
| 4 | 650 | 470 | 100 | 90 | 15 | 480 | 450 |
| 5 | 600 | 470 | 50 | 88 | 12 | 480 | 440 |
| 6 | 550 | 470 | 50 | 88 | 10 | 480 | 400 |
| 7 | 630 | 460 | 80 | 90 | 15 | 485 | 450 |
| 8 | 700 | 470 | 150 | 90 | 25 | 485 | 460 |
| 9 | 600 | 465 | 50 | 90 | 15 | 470 | 445 |
| 10 | 630 | 460 | 90 | 90 | 20 | 470 | 445 |

As is shown in Table 3, exhaust gas cleaners in Examples 4–10 give small pressure loss. This means that the exhaust gas cleaners in Examples 4–10 can burn and remove particulate matter from the filters effectively. The table also shows that the exhaust gas cleaners in Examples 4–10 can function to reduce CO, HC and NO$_x$ with high efficiency.

EXAMPLE 11

Doughnut-shaped disc filters made of mullite each having a thickness of 1 mm were set in a sputtering apparatus and were subjected to a plasma etching for half an hour. The plasma etching was conducted by applying a high-frequency electric power of 200 Watt in an atmosphere having an oxygen partial pressure of $1 \times 10^2$ Torr. By the etching, fine projections having an average diameter of about 0.1 μm were formed on the surface of the filters. The filters then were subjected to sputtering of Pt to fix Pt to the surfaces of the fine projections. The filters were rotated by a speed of about 3.5 rpm during the sputtering. The resulting Pt layer on the surface of each fine projection of the filter was 20 to 30 Å thick.

A copper wire mesh disc shown by 2a in FIG. 2 was used as a grounded electrode, and disc made of a stainless steel shown by 2c in FIG. 2 was used as a nongrounded electrode. Both discs were 1 mm thick. A cordierite tube was employed as a ceramic tube 9.

The parts mentioned above were built in the exhaust gas cleaner shown in FIG. 4. The exhaust gas cleaner then was connected to a tube for an exhaust gas in the same way as in Example 4. Pulse dc voltage of 35 V high was applied between electrodes while the diesel engine was operated, and the pressure difference (pressure loss) of the exhaust gas between the inlet and the outlet was measured in the same way as in Example 4. It was observed that as soon as the current reached a maximum level, the particulate matter started burning. Immediately after the particulate matter started burning, the amplitude of the current dropped. The maximum pressure loss was observed when current dropped. The concentrations of CO and HC in the exhaust gas were also measured continuously both at the inlet and at the outlet, when the exhaust gas temperature was 250° C. The results are shown in Table 4.

EXAMPLE 12

Doughnut-shaped disc filters made of mullite were subjected to plasma etching in the same way as in Example 11. After the etching, the filters were subjected to an electroless plating to form a Pd layer on the projections of the filters. The Pd layer formed was 20 Å thick on the average.

The resulting filters were built in the exhaust gas cleaner shown in FIG. 4 and the same test as in Example 11 was performed. The results are shown in Table 4.

TABLE 4

| | Pressure | Concentration (ppm) | | | |
|---|---|---|---|---|---|
| | | CO | | HC | |
| Example No. | Loss (mmAq) | at Inlet | at Outlet | at Inlet | at Outlet |
| 11 | 650 | 460 | 90 | 90 | 15 |
| 12 | 700 | 465 | 145 | 90 | 25 |

As is shown in Table 4, the exhaust gas cleaners of Examples 11 and 12 gave quite small pressure losses. This means that particulate matter trapped by the filters were burned effectively. The table also shows that CO and HC were reduced by the exhaust gas cleaner with high efficiency.

As explained above, the exhaust gas cleaner according to the present invention can trap burnable fine particles such as particulate matter in exhaust gases effectively and burn them, so that the filters of the exhaust gas cleaner are not clogged. Since the burning of fine particles can take place in all parts of the filters, no choking of the filters will be experienced. Therefore, the exhaust gas cleaner of the present invention can maintain a high ability to clean an exhaust gas for a long period of time.

Since the filters of the exhaust gas cleaner can carry catalysts with high concentration, igniting particulate matter in the filters becomes easier. By selecting catalysts carried on the filters, harmful gas components such as NO$_x$, HC, CO, etc. as well as particulate matter from the exhaust gas can be reduced.

What is claimed is:

1. An exhaust gas cleaner comprising:
   (a) at least one planar filter element for trapping particulate matter in an exhaust gas, said filter element being made of a heat-resistant and electrically insulating material and having a hole therein;
   (b) at least a pair of planar electrodes each having substantially the same shape and area as said filter element and having a hole therein of the same size as the hole in said filter element, said electrodes being stacked alternately with said at least one filter element with the holes therein in alignment so as to define a gas-flow path;
   (c) a housing enclosing a stack of said at least one filter element and said electrodes and having an inlet aligned with said gas-flow path for introducing an exhaust gas which flows through said at least one filter element in a direction substantially parallel to the laminate surfaces of its adjacent electrodes, and an outlet for discharging filtered exhaust gas; and
   (d) means for applying between adjacent electrodes of said stack a voltage sufficient to cause electric current to flow through particulate matter trapped in said at least one filter element only when sufficient particulate matter to conduct electric current between said electrodes is trapped, which generates heat for burning electrically conductive and burnable particulate matter trapped in said filter element and automatically stops flowing when sufficient particulate matter has been burned that not enough remains to conduct current between said electrodes.

2. The exhaust gas cleaner according to claim 1, wherein said filter is carrying a catalyst which functions to reduce harmful gas components in said exhaust gas.

3. The exhaust gas cleaner according to claim 2, wherein said catalyst is carried on $TiO_2$ or a complex compound of $TiO_2$ which is coated on said filter.

4. The exhaust gas cleaner according to claim 2, wherein said catalyst is carried on the surface of said filter, said surface being provided with fine projections having an average diameter smaller than 1 micrometer and a length-to-diameter aspect ratio of 10 or less, by etching.

5. The exhaust gas cleaner according to claim 1, wherein each of said filter and said electrodes is in a disc shape, said hole located centrally therein.

6. The exhaust gas cleaner according to claim 5, further comprising a ceramic tube disposed in said flow path.

7. The exhaust gas cleaner according to claim 2, wherein said catalyst consists essentially of (a) at least one oxide of alkali metal elements; (b) one or more oxides of elements selected from the group consisting of elements in IVA, VA, VIA, VIIA and VIII groups in the Periodic Table, excluding platinum-group elements, Cu, Zn and Sn; and (c) at least one oxide of rare earth elements.

8. The exhaust gas cleaner according to claim 2, wherein said catalyst consists essentially of one or more elements in the platinum group.

9. The exhaust gas cleaner according to claim 7, wherein said filter further carries another catalyst consisting essentially of one or more elements in the platinum group.

10. The exhaust gas cleaner according to claim 7, wherein said catalyst further includes one or more elements selected from the group consisting of Au and Ag.

11. The exhaust gas cleaner according to claim 8, wherein said catalyst further includes one or more elements selected from the group consisting of Au and Ag.

* * * * *